Patented June 17, 1941

2,246,049

UNITED STATES PATENT OFFICE 2,246,049

PROCESS OF PREPARING GLYOXAL

Heinrich Lange, Frankfort-on-the-Main-Hochst, Germany, assignor, by mesne assignments, to General Aniline & Film Corporation, New York, N. Y., a corporation of Delaware No Drawing. Application May 27, 1939, Serial No. 276,227. In Germany June 8, 1938

8 Claims. (Cl. 260—601)

The present invention relates to a process of preparing glyoxal.

It is known that glyoxal can be made, in its monomeric form, only with difficulty and with an insufficient yield. The polymeric form is more easily accessible, but most of the known processes of its manufacture lead to a product intermixed, more or less, with inorganic and organic substances the presence of which impedes or even hinders further working up. The product cannot be purified by distillation, since the polymeric glyoxal cannot be distilled and when subjected to high temperatures is depolymerized only to a small extent, the greater part of it being condensed to form resin-like products.

Now I have found that solutions of glyoxal having a high degree of purity may be obtained by first transforming glyoxal-tetracetate, in a suitable manner, into the corresponding glyoxal-tetracetal, then saponifying the acetal formed, in the presence of water, by means of a comparatively strong acid, for instance a dilute mineral acid, and esterifying the acetic acid set free and distilling it. The residue of distillation, after neutralizing the mineral acid by means of caustic soda solution, contains only water and glyoxal besides some traces of a mineral salt such as Na₂SO₄.

This reaction may be represented by the following equation:

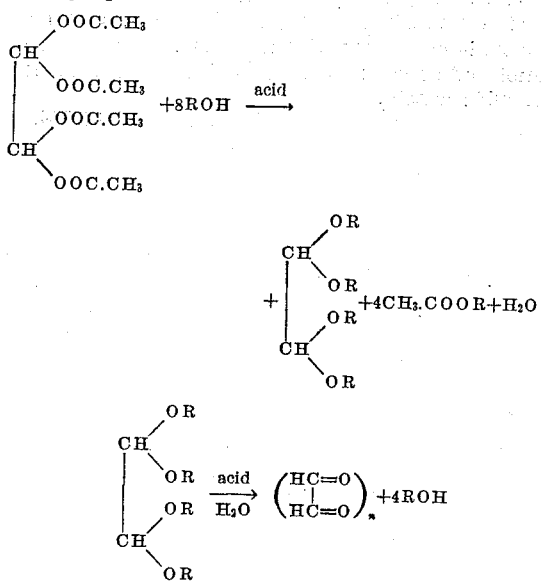

The process is carried out by heating 1 mol of glyoxal-tetracetate with at least 4 mols of an aliphatic monoalcohol and at least 4 mols of water in the presence of an acid stronger than acetic acid.

The very smooth transformation of the tetracetate into the acetal is especially surprising.

If the transformation of the glyoxal-tetracetate into the tetracetal and the saponification of the acetal to form the glyoxal is carried out in one single reaction, in the presence of the theoretical amount of water and a more or less large excess of an alcohol, for instance an aliphatic monoalcohol such as methanol, ethanol or propanol, the acetic acid is nearly quantitatively converted into the corresponding ester, the glyoxal being obtained, in a very pure state, in the aqueous solution; the yield corresponds with 90 to 96 per cent of the theoretical. Only traces of alkali salts of the mineral acids are still contained in the solution. The excess of alcohol used in the reaction may amount to two to ten times the quantity theoretically necessary which is 4 mols calculated upon 1 mol of glyoxal-tetracetate. The water is preferably used in the theoretically necessary amount (likewise 4 mols corresponding to 1 mol of glyoxal-tetracetate) up to the double thereof.

As acids there may, for instance, be used the following: sulfuric acid, hydrochloric acid, phosphoric acid, benzenesulfonic acid, oxalic acid, tartaric acid or the like.

The acids are used in a quantity as it is usual for a catalyst in saponification and acetalization processes. The more acid is added the more rapidly proceeds the reaction.

The reaction may already be carried out at temperatures of about 30° C., but it is suitable to heat the mixture to boiling.

The reaction is complete when no longer an ester is formed.

The following examples serve to illustrate the invention, but they are not intended to limit it thereto; the parts are by weight, the ratio of parts by weight to parts by volume is that of the kilo to the liter:

(1) 262 parts of glyoxal-tetracetate and 2.5 parts by volume of concentrated sulfuric acid are heated to boiling in the presence of 1000 parts by volume of alcohol and 50 parts of water. The whole is distilled, on the steam bath, in the course of 7 hours, until no alcohol or ethyl acetate any longer distils. The residue of distillation is diluted with half its volume of water and then again distilled under the same conditions. Whereas the combined distillate (1150 parts by volume) contains, besides some water, nearly the theoretical amount of the excess of alcohol and the ethyl acetate, the residue of distillation (168 parts by volume) contains pure glyoxal amounting to a yield of 92 to 96 per cent. The glyoxal solution, which is feebly acid with mineral acid and is, for instance, of 28 per cent strength, may directly be used for further reactions. In case a higher concentration is desired or if the acid reaction is inconvenient, the solution may either be concentrated by evaporating to 70 per cent strength or it may be neutralized by means of a solution of barium hydroxide or sodium hydroxide.

If a larger quantity of sulfuric acid is used, for instance five times the above named quantity, the reaction proceeds more rapidly.

(2) The procedure is the same as indicated in Example 1 with the exception that the reaction mixture is, after the first distillation on the steam bath, not diluted with water and again distilled, but the residue obtained by the first distillation is immediately subjected for a short time to steam-distillation in order to blow off the residual alcohol and ethyl acetate.

|  | Per cent of the theoretical |
|---|---|
| Yield of glyoxal | 96 |
| Yield of ethyl acetate | 99 |

(3) The procedure is the same as that indicated in Example 1 with the exception that, instead of sulfuric acid, there is used the equimolecular amount of oxalic acid, namely 4.13 parts.

Yield of glyoxal: 94 per cent of the theoretical.

(4) 262 parts of glyoxal-tetracetate are treated, according to Example 1, with 2.5 parts by volume of concentrated sulfuric acid in the presence of 192 parts of alcohol (theoretical amount) and 50 parts of water. There are obtained 270 parts of a distillation residue containing 20.8 per cent of glyoxal which corresponds with 56 parts of glyoxal. The yield of glyoxal amounts, therefore, to 96 per cent of the theoretical. The ethyl acetate is, in this case, obtained in the distillate only in an amount corresponding with 86 per cent of the theoretical yield.

(5) 262 parts of glyoxal-tetracetate and 2.5 parts by volume of concentrated sulfuric acid are heated to boiling, for 12 hours, under reflux in the presence of 500 parts by volume of methanol and 50 parts of water, and the reaction mixture is further treated as indicated in Example 1. There are obtained 223 parts of a distillation residue containing 23.3 per cent of glyoxal; the yield of glyoxal, therefore, amounts to 90 per cent of the theoretical. The distillate contains an amount of methyl acetate corresponding to 98 per cent of the theoretical yield.

(6) 131 parts of glyoxal-tetracetate are treated, as described in Example 5, with 1.25 parts by volume of concentrated sulfuric acid in the presence of 64 parts of methanol (theoretically required amount) and 25 parts by volume of water.

Yield of glyoxal: 93 per cent of the theoretical.

I claim:

1. In the process of preparing glyoxal the step which comprises heating 1 mol of glyoxal-tetracetate with at least 4 mols of an aliphatic monohydroxy alcohol and at least 4 mols of water in the presence of a non-oxidizing acid stronger than acetic acid.

2. In the process of preparing glyoxal the step which comprises heating 1 mol of glyoxal-tetracetate with more than 4 mols of an aliphatic monohydroxy alcohol and 4 mols of water in the presence of a non-oxidizing acid stronger than acetic acid.

3. In the process of preparing glyoxal the step which comprises heating 1 mol of glyoxal-tetracetate with at least 4 mols of ethanol and at least 4 mols of water in the presence of a non-oxidizing acid stronger than acetic acid.

4. In the process of preparing glyoxal the step which comprises boiling a mixture of 1 mol of glyoxal-tetracetate with at least 4 mols of an aliphatic monohydroxy alcohol and at least 4 mols of water in the presence of a non-oxidizing acid stronger than acetic acid.

5. In the process of preparing glyoxal the step which comprises boiling a mixture of 1 mol of glyoxal-tetracetate with at least 4 mols of ethanol and at least 4 mols of water in the presence of a non-oxidizing acid stronger than acetic acid.

6. In the process of preparing glyoxal the step which comprises boiling a mixture of 1 mol of glyoxal-tetracetate with at least 4 mols of ethanol and at least 4 mols of water in the presence of sulfuric acid.

7. In the process of preparing glyoxal the step which comprises boiling a mixture of 1 mol of glyoxal-tetracetate with at least 4 mols of ethanol and at least 4 mols of water in the presence of oxalic acid.

8. In the process of preparing glyoxal the step which comprises boiling a mixture of 1 mol of glyoxal-tetracetate with at least 4 mols of methanol and at least 4 mols of water in the presence of sulfuric acid.

HEINRICH LANGE.